May 15, 1962   M. P. FREITAS ETAL   3,034,718
COMPUTER-CONTROLLER SET POINT SYSTEM
Filed April 18, 1960   2 Sheets-Sheet 2
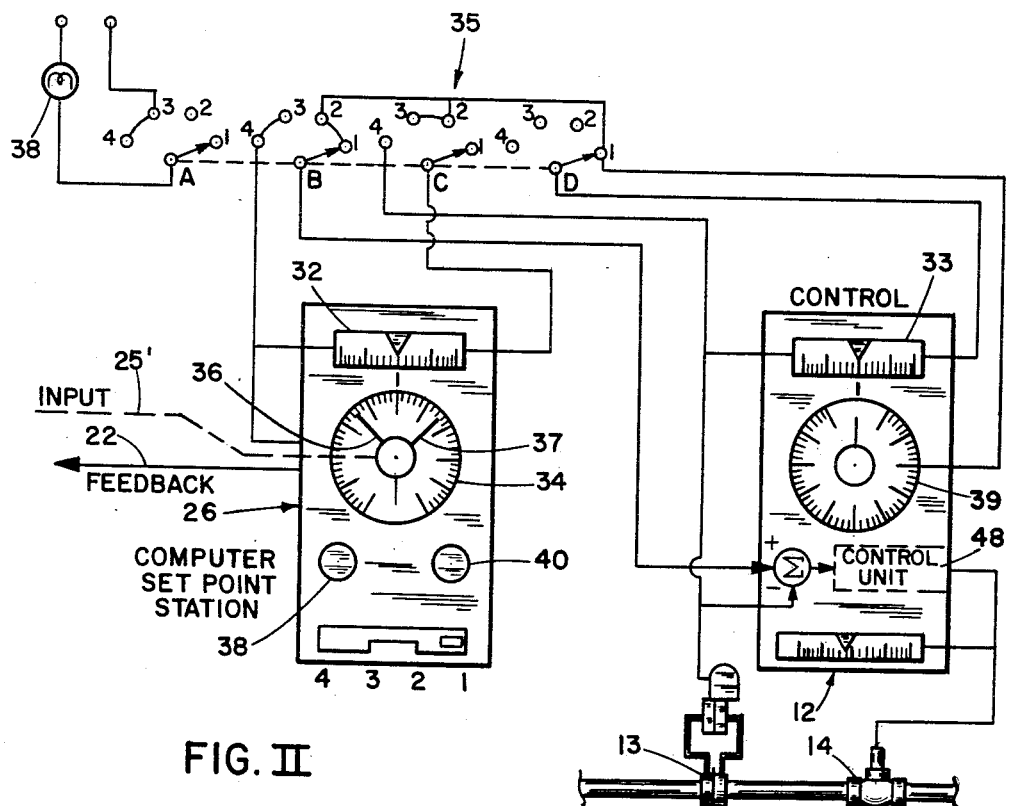
FIG. II
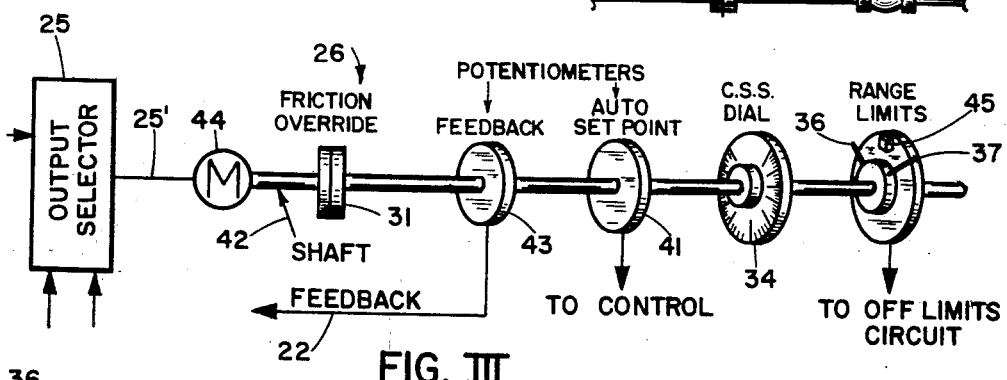
FIG. III
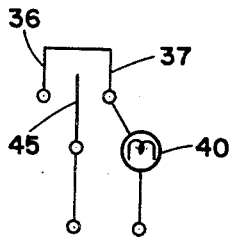
FIG. IV
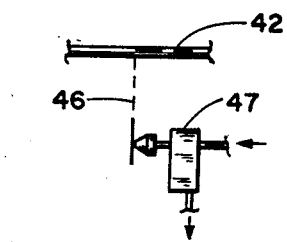
FIG. V
INVENTORS
MANUEL P. FREITAS
BY WILFRED H. HOWE
Lawrence H. ____
AGENT

United States Patent Office 3,034,718
Patented May 15, 1962

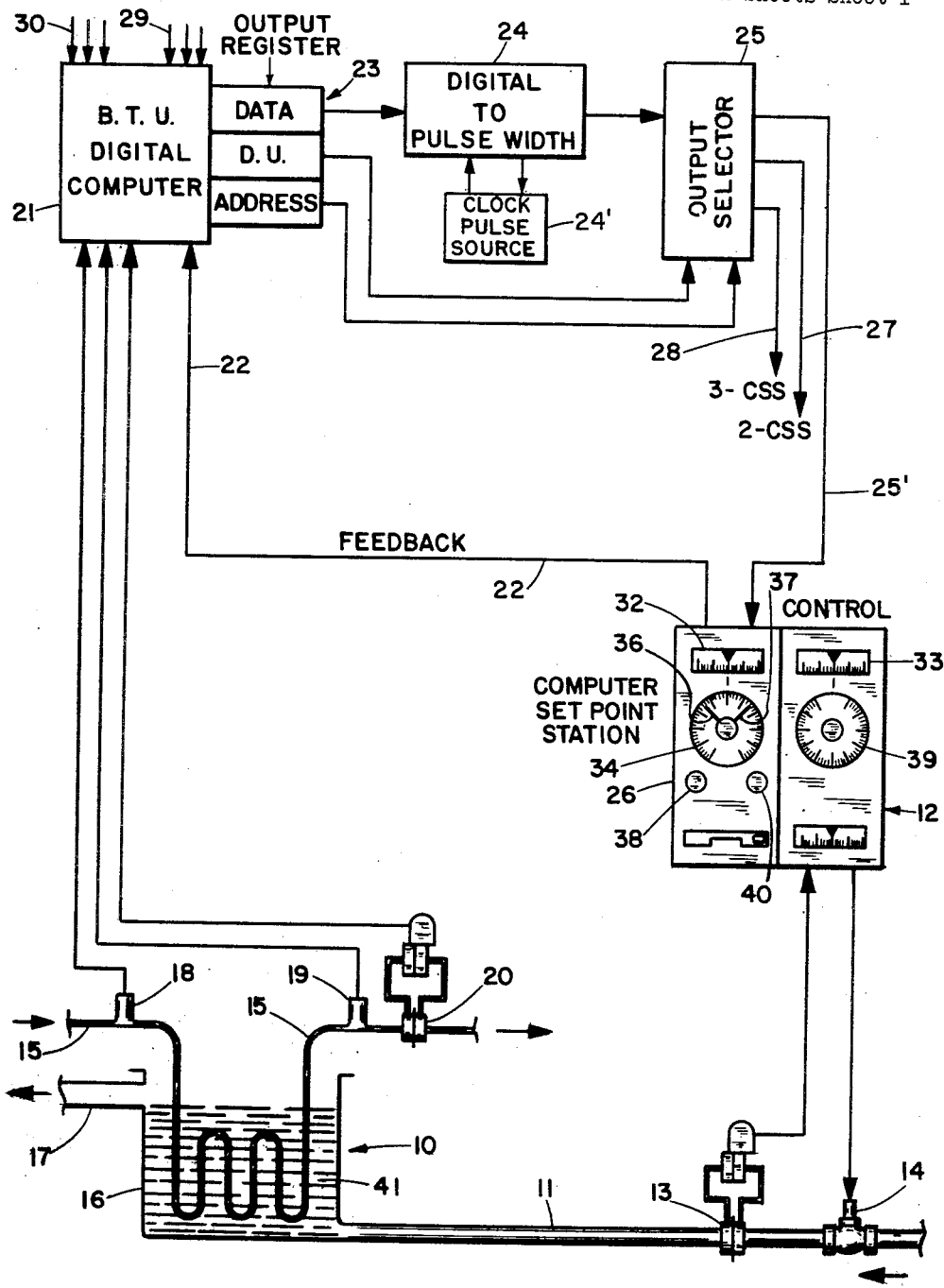
FIG. I

3,034,718
COMPUTER-CONTROLLER SET POINT SYSTEM
Manuel P. Freitas, Stoughton, and Wilfred H. Howe, Sharon, Mass., assignors to The Foxboro Company, Foxboro, Mass., a corporation of Massachusetts
Filed Apr. 18, 1960, Ser. No. 23,055
16 Claims. (Cl. 235—151)

This invention relates to a system for determining desired set point values for an analog controller from the output of a digital computer, and has particular reference to such a system including means for translating the output of a digital computer to analog terms and an analog set point station responsive to such terms.

In modern industrial instrumentation there is a growing field of combined use of digital and analog systems. Thus interconnections, couplings, and translations between such systems are increasingly needed. One particular need is that of analog control set point adjustment in accordance with digital determinations. This invention provides simple, inexpensive and reliable means for filling this need.

This invention provides a combination of a digital computer, a digital condition to analog pulse factor translator, and a set point station, to provide analog set point determinations.

In such a combination, as related to an analog controller, this invention provides switching means which involves transfer from analog set point manual adjustment to automatic (computer controlled) analog set point adjustment, with facilities for "bumpless" transfer from either adjustment condition to the other.

This invention contemplates analog set point adjustment in any form, for example, electrical or pneumatic.

This invention lends itself to the use of a single digital computer to provide set-point service individually to each of many analog controllers. This is possible on the basis of the provision in this invention of non-volatile memory storage arrangements such as, for example, electric motor shaft positions.

Accordingly, an illustration of an overall system embodying this invention is a series of analog controllers and their associated processes, a single digital computer which, for each of the analog controller associated process combinations, is responsive to a group of process or calculated variables, which may be directly related to the particular process or may be imparted to the system in a pre-programmed manner, a digital to analog translation station, a computer output selector, and an analog set point station for each of the analog controller-process combinations.

A significant factor in this invention is the use, as desired, of a feedback from each set point station to the computer, as one of the input variables to the computer, to provide a comparison situation in the computer to relate actual set point station condition to desired set point station condition.

A further factor of importance in this invention is translation of digital situations to analog situations on a pulse width basis, thus establishing simple and reliable means of accomplishing such translation.

It is, therefore, an object of this invention to provide a new and improved analog controller set point determination system, involving a digital computer, a digital to analog translation means, and an analog set point station.

Other objects and advantages of this invention will be in part apparent and in part pointed out hereinafter, and in the accompanying drawings, wherein:

FIGURE I is an overall illustrative analog controller set point adjustment system embodying this invention;

FIGURE II is a detail of an analog set point station of the FIGURE I system, as related to the digital computer and to an analog controller;

FIGURE III is a further detail of an analog set point station according to the FIGURES I and II, specifically showing items of response to the computer output in an electrical situation;

FIGURE IV is an off-limits light circuit of the set point station of FIGURES I, II and III, for indicating action of the computer output beyond established range limits; and FIGURE V is an illustration of means for achieving a pneumatic set point situation from the system of FIGURE III.

The FIGURE I overall system illustrates, at the bottom of the drawing, a process indicated at 10, with this process controlled by a flow thereto through a pipe 11 and the flow controlled by means of a standard control system comprising a controlelr 12, a flow sensing unit 13, and a control valve 14.

The process 10 is a heat exchange situation wherein a liquid flow through a pipe 15 is maintained at a desired temperature by heating means involving a coil configuration of the pipe 15 within a tank 16, through which a heating liquid is passed from the input flow pipe 11 to an overflow outlet 17. The temperature condition of the liquid in the pipe 15 is determined from a series of variables, that is, upstream temperature $T_1$ as obtained from a temperature sensing element 18, downstream temperature $T_2$ from a sensing element 19 and flow F from a downstream flow sensing element 20. These sensing elements may be electrical or pneumatic, with suitable conforming arrangements to properly apply their output to the digital computer. These factors are related to B.t.u. determination in a digital computer indicated at 21. The computer determines the B.t.u. condition of the liquid in the pipe 15 according to the formula $F(T_1-T_2)$. A further variable is applied to the input of the computer in the form of a feedback indicated at 22, whose source will be explained later herein.

The computer 21 has an output register 23 involving the data condition, D. U. or down or up, that is the direction of action, and the address section. The information in the data section is treated as indicated in unit 24 which in the special consideration of this invention is a means of translating digital output data to analog condition by a countdown method which translates the digital signal to a pulse width analog type of signal. A series of flip-flop circuits is provided in association with the output data and the countdown method involves operation of these flip-flop circuits.

The translation function is ordinarily carried out in the output register. For purposes of explanation it is indicated as in the translation unit 24, in the direct output of the data section of the output regiser. For his purpose he flip-flop circuits may be considered to be in the translation unit 24. These circuits are loaded from the computer in digital form.

A clock pulse device 24' is provided to apply pulses to the flip-flop arrangements so that their loadings (computer digital output) may be counted down to zero.

A suitable total coincidence detector is used as a part of the translation device 24, to determine when the output register data signal reaches zero, at which time the clock pulse device 24' is automatically stopped and the analog pulse width terminates. Arrows between the clock pulse device 24' and the translation device 24 indicate count down pulses to the device 24 and start and stop control to the clock pulse device 24'.

The action of starting the analog pulse width signals from the output register is initiated, as desired, from a suitable computer program.

The output of the translator 24 is applied to an output selector 25 and as governed by the D. U. and address of the output register 23, the output selector directs the now analog pulse type of signal to a particular one of a series of operating units. One such unit is shown at the right of the drawing and comprises the flow control unit 12 and a computer set point station 26. Other such combinations are possible in multiple arrangements as desired and as indicated herein as number 2 computer set station (CSS) 27 and number 3 computer set station (CSS) 28.

The description herein will relate to one overall system as shown in FIGURE I, since the details of other systems such as number 2 computer set station and number 3 computer set station are the same except in particular arrangements and values. For example a series of variables as at 29 are indicated as an input to the digital computer 21 as well as a third series of variables as at 30. Thus the variables 29 could be those related to number 2 computer set station and the variables 30 could be those related to number 3 computer set station, with suitable programming arrangements to properly associate the correct input variables with the correct output from the output selector according to its operation. The variables such as 29, 30, may be set up in any desired form, from any desired source. For example, input patterns of variables may be taken from preformed punch card arrangements, for process start up situations, changing process conditions, or the like.

In the overall system as shown in FIGURE I the computer set point station 26 receives the analog pulse width signal from the output selector 25 and is operated in the sense of adjusting a positionable device such as a motor driven potentiometer according to the signal from the selector 25. This action results in the feedback 22 from the computer set point station 26 as indicated at 22 and previously mentioned.

The main action of the computer set point station 26 is to adjust the set point of the controller 12 to vary the input flow to the process 10 through the pipe 11 in accordance with the computed need therefor as referenced with respect to the feedback from the computer set point station 26.

The standard controller 12 and its associated elements may be pneumatic or electric and is used to manipulate the flow valve 14 or other such final elements as desired to control the value of a given set of process variables in accordance with the set point of the controller. As indicated, information from the processes is fed to the computer and covers significant process conditions. On the basis of this information the computer determines the desired value of certain controllable variables. One such variable as indicated is the flow to the process 10 through the pipe 11 as controlled from the controller 12 by means of the valve 14 and the flow sensing element 13.

This invention thus comprises an arrangement whereby the information in the computer as to the desired value of the variables is converted into set points for standard controllers. An important part of this invention is the set point station. One set point station as at 26 is associated with each controller as at 12. This set point station 26 receives information from the computer 21, feeds back (22) information to the computer and transfers information to the controller 12 in the form of a set point signal compatible with the standard controller. Since there is one set point station for each controller, it is desirable to have the set point station 26 as simple as possible.

The set point station 26 and associated circuits in the computer 21 provide for transforming a digital signal which is read out at intervals into a continuous electrical, pneumatic or positional signal compatible with a standard controller. Basically this involves a digital-to-analog pulse width conversion and a nonvolatile memory which holds the analog signal between readout intervals and alters it at each readout to the new value determined by the computer 21. In addition, provision is made for manual override (FIGURE III, item 31) of the computer setting.

The arrangement of this invention provides either for standard set point control operation independent of the computer or for computer controlled operation whereby the set point of the controller is adjusted from the computer. When the operation is under control of the computer 21, the set point station 26 provides continuous indication, dial 34, of the set point as established by the computer, and also the difference between this set point and the actual measured value of the variable as maintained by the controller 12, see indicator 32.

When the operation is under control from a manually established set point in the controller 12, this manual set point is indicated, dial 39, on the controller 12 and the difference between this set point and the controlled value of the variable is indicated on indicator 33. At the same time, the set point station 26 indicates, dial 34, the value of set point which the computer 21 sets up as desired.

There is a switching arrangement (FIGURE II) (35) for transferring, from manual to computer setting or the reverse, the set point in the controller 12. To facilitate bumpless transfer, the indicator 32 is switched to connections which make it a transfer indicator, to read a zero null when the manual set point on the controller 12 and the computer established set point in the set point station 26 coincide. The set point station 26 has an adjustable limit switch arrangement, items 36, 37, and FIGURE IV, which can be set to limit the operating range high and low values of set point which can be established by the computer 21.

The maximum rate at which the computer can increase or decrease the value of the set point is controlled by standard means (not shown), for example, means for controlling motor speed by changing gear ratios in the station 26. Further, a signal light 38 is provided on the set point station 26 which indicates whether the set point is under control of the set point dial 39 on the controller or the set point dial 34 on the set point station 26. A second signal light 40 is provided, on the set point station 26, to indicate when the maximum or minimum limit of set point on the set point station 26 has been reached.

In FIGURE I, one process, one computer and a group of controllers with set point stations are indicated. Information from the process is fed to the computer 21 and to the controller 26. Information from the computer 21 is fed to the set point station 26, and information from the set point station 26 is fed back to the computer 21 by way of feedback 22. Each controller feeds a control signal to a valve such as 14 or other equivalent final control element associated with the particular process.

FIGURE I shows, for illustration, a single controller 12 and a set point station 26 operating on a specific variable of a defined process (10). The process shown is a heat exchanger. This may be a complete process in itself or may be a section of a larger process. As shown, there is a fluid to be heated passing through a pipe 15 coiled in the heat exchanger, surrounded by a heating fluid 41. For purposes of this discussion, it is assumed that it is desired to add a definite quantity of heat per unit time to the fluid to be heated. This quantity of heat to be added may be a simple predetermined quantity, a programmed quantity or a quantity determined by the computer from measurements of an over-all or associated process.

The amount of heat actually added to the fluid is determined from measurements of the flow of the fluid to be heated using the sensing unit 20, an orifice and a differential pressure transmitter, and the difference between entrance and exit temperatures of the fluid to be heated, using thermometers 18, 19 in the inlet and outlet lines. The computer is assumed to compute a linear flow value from the signal obtained from the flow transmitter and to multiply this flow by the temperature difference between inlet and outlet (B.t.u.=$KF(T_1-T_2)$), to establish the total B.t.u. per minute added to the fluid being heated with the constant K as needed. From the measured value of B.t.u. per minute, with perhaps additional information from temperatures of heating and heated fluid, the computer 21 derives a value of flow which is calculated to produce the value of B.t.u. per minute that is desired. This desired value of flow is in the form of a digital number. This number is computed and stored through a suitable address in the computer memory. Computer functions of this nature are standard.

As shown in FIGURE III, the set point station 26 has a potentiometer 41 attached to a set point shaft arrangement 42 which produces a signal representing the value of the set point in the set point station. The feedback is from another potentiometer 43 also on the shaft 42, although a single potentiometer can be used for both functions.

At suitable intervals in accordance with the computer program, the number representing the computed desired flow value is withdrawn from the memory and compared with the number representing the set point in the set point station 26. The number which is the difference between these two numbers then becomes the set point error signal and is transferred to another section of the computer. This number will be positive or negative D. U. in the output register depending on the sign of the error. In the section of the computer to which this number has been transferred, there is the data register and clock mechanism as indicated at 23, 24, 24′ and referred to hereinbefore as the means for generating the analog pulse width signal. This translation mechanism counts down the contents of the data register to "zero," at a programmed rate. A positive or negative motor drive signal is sent from the computer to the set point station 26 during the interval while the counter is counting to the error number to zero. Thus a time duration pulse is provided to the set point mechanism proportional to the magnitude of the number representing the difference between the computed value of set point and the actual value of the set point in the set point station. This comparison is made at regular intervals in accordance with the program in the computer.

In the set point station as indicated in FIGURE III, there is a motor 44 which operates the set point station dial 34 and the two potentiometers 41 and 43 through the shaft arrangement 42. This is a reversible constant speed motor which is operated from the time duration signal from the computer 21. The motor 44 thereby produces a positioning motion of the set point dial 34 and its associated potentiometers 41 and 43 whose direction and magnitude is proportional to the sign and magnitude of the error signal. This results in a servo loop which, at each programmed interval, tends to bring the set point dial 34 to the value determined by the computer 21. An auxiliary, range limit arrangement, items 36, 37 and FIGURE IV, provides for a limit stop for each set point adjustment and thereby controls the range wherein the set point can be changed.

As shown in FIGURE I, the set point station 26 and controller 12 are located together. The controller 12 is a standard flow controller deriving its measurement from a sensing element 13 which measures the differential pressure across an orifice in the heating fluid flow line 11. The controller 12 provides a signal which operates a valve 14 which controls the amount of heating fluid supplied to the heat exchanger, thereby functioning to control the total B.t.u. transferred to the fluid to be heated in pipe 15. The flow controller is standard, with a valve indicator and with the control valve 14 controlling the flow of heating fluid at the value established by the set point of the flow controller 12. The set point can be controlled manually from dial 39. The only modifications of a standard flow controller necessary for this system are that the potentiometer associated with the set point of the flow controller 12, and the indicator 33, have their connections taken through the set point station 26.

In furtherance of the FIGURE III schematic indication of structure detail within the computer set point station 26 of FIGURES I and II, the computer output selector 25 is shown with the output from the selector to the set point station 26 indicated at 25′. The signal in the output 25′ is an electrical one in pulse width analog form and it is applied to a motor 44. This whole arrangement in FIGURE III is set up in each of the computer set point stations in the overall system that is, with respect to FIGURE I, number 2 CSS, and number 3 CSS each would have its own computer set point station and within each of those stations an arrangement such as indicated in FIGURE III. The motor 44 is operated to drive the shaft 42 in rotation. This shaft arrangement mounts the friction override clutch 31, the feedback and set point potentiometers 41 and 43, the CSS dial 34, and the range limits 36 and 37.

The friction override device 31 is a means for manually overriding of the automatic action of this device by operation of the dial 34. The feedback potentiometer 43 is operated to send a signal back through feedback line 22 to the digital computer as an indication where the set point is in actuality in the automatic system so that the computer can then set up in its output the demand for the necessary percentage change. The same rotary motion of the shaft 42 in accordance with the output signal from the computer operates the automatic set point potentiometer 41 to give an output signal in the form of a set point condition which is applied to the usual set point input in the controller 12 of FIGURE II, for example.

Further in FIGURE III, and with respect to the rotation of the shaft 42, the dial 34 is rotated thereby, and in association therewith, the range limit arrangements 36 and 37 are provided in association with a movable contact 45. The circuit arrangement for this range limit system is shown in FIGURE IV so that as the shaft 42 is rotated the contact 45 is moved one way or the other and as it engages one or the other of the limit arms 36 and 37 a circuit is completed and the off limits light 40 is lit. Suitable mechanical arrangements (not shown) are provided at will for the rotary adjustment of the limit stops 36 and 37. As one example the stops 36 and 37 are adjusted to the desired locations and then fixed and thereafter the operation of the shaft 42 in rotation moves the contact 45 one way or the other according to the signal.

In general the description herein relates to a fully electronic system. However this invention is amenable to the use of a pneumatic control system in the control unit 12 and when such is the case the structure of the FIGURE III arrangement is slightly changed in that a substitution is made for the automatic set point potentiometer 41 with the arrangement shown in FIGURE V. Schematically in FIGURE V the shaft 42 is shown to move a mechanical member, linkage, or other suitable motion changing arrangement 46 to operate a standard form of nozzle baffle pneumatic relay unit 47. The output of this relay is thereafter applied to whatever pneumatic set point arrangement is provided in the related controller of the same general character as the controller 12 in FIGURE II. This pneumatic arrangement is usually in the form of a bellows within such a controller with the bellows movement operating mechanical devices and pneumtaic relays so that the valve operated by the controller can be operated pneumatically if desired.

An important area of this invention lies in the relationship between the set point station 26 and the controller 12. Referring to FIGURE II it will be seen that a switching arrangement 35 is provided for so relating these units.

As shown in FIGURE II this invention provides means whereby the set point of the controller 12 may be manually operated from the controller itself by means of operating dial 39. It may be also automatically operated from the computer through the set point station 26 as it rotates the dial 34. An associated provision is that in the automatic situation the automatic operation may be overridden by manual operation of the dial 34 through the friction override clutch coupling member 31 as indicated in FIGURE III. Transfer arrangements are provided in the FIGURE II showing so that a shift from manual to automatic computer control and the reverse, in the sense of a shift from the controller 12 to the set point station 26 and the reverse, is provided through the switching arrangements 35 on a basis of what is called "bumpless" transfer. That is to say in whatever situation the set point finds itself at a given moment, arrangements are made before shifting over, to match up the set point signals so that the shift can be made without a sudden serious disturbance of the output of the controller 12.

In the condition of manual operation of the controller 12 the dial 39 is manually operated and the indicator 33 is so connected as to indicate the difference between the manual set point thus established and the actual measurement from the flow sensing unit 13. In a like fashion when the computer control automatic situation is in operation through the set point station 26, the dial 34 is rotated and the indicator 32 in the set point station is so connected as to indicate the difference between the set point condition of the dial 34 and the actual measurement from the process flow, that is from the same flow sensing unit 13.

In the transfer switch arrangements indicated on the lower face of the set point station 26 as 1, 2, 3, 4, in going from manual at 1, that is with the controller 12, to automatic at 4, with the set point station 26 operating the controller set point, there are intermediate seps 2 in one direction and 3 in the other direction.

Thus the transfer is a manual mechanical arrangement through a switching lever on the face of the set point station 26. This is schematically indicated in FIGURE II above the set point station with switch units A, B, C and D, each of which has positions 1, 2, 3 and 4 in reference to the positions 1, 2, 3 and 4 on the face of the set point station 26.

Thus in the manual situation, that is position 1, it will be seen that the controller 12 dial 39 controls the set point of the control unit 48 within the controller 12. The connection from the dial 39 is through switch unit D, station 1 then through switch unit B stations 2 and 1, to the set point input of the controller 12. In this condition the indicator 33 has one side connected directly to the flow sensing unit 13 and the other side connected to the set point adjustment arrangement through set point dial 39 through the switching arrangement unit D, station 1.

In the automatic position, that is position 4 of the switching arrangement, note that the set point station dial 34 is connected to the set point input of controller 12 through unit B of the switching system position 4. At the same time the set point station indicator 32 is connected on the one hand to the automatic dial 34 and on the other hand to the sensing element 13 through the switching system unit C position 4.

Further, in like tracings through the switching arrangement it will be seen that in positions 2 and 3 of the switching system the set point station indicator 32 is connected between the automatic set point dial 34 and the manual set point dial 39 to represent the difference between manual and automatic set, that is between the set point established by the set point station 26, and that established by the controller 12. In these situations one or the other of the dials may be adjusted to bring about a null situation in the indicator 32, after which the further operation of the transfer switch either to automatic or manual may be accomplished without process upset, i.e. bumpless transfer.

It may be noted in the transfer switch operation from manual to automatic, that is, from positions 1 to 4 the important positions are the initial position 1 and the balancing position 2. Thereafter position 3 is skipped in the straight movement to automatic at 4.

In like manner when the transfer action is from computer automatic set point control to manual control, that is from the set point station 26 to the control 12, the movement is from switching position 4 backwards through 3, 2 to 1 (manual). In this situation movement is from the automatic position in 4 to the balancing position 3, and balance having been achieved, the full switching is then direct to station 1 there being no need in this direction for position 2. It may be noted that switching positions 1 and 2 are both on manual control, the difference being in the representation on the indicator. Position 1 shows the difference between measurement and manual set point and section 2 shows the difference between manual set point and automatic set point.

Similarly as between the positions 4 and 3, they are both on automatic set point control, the difference being that the indicator 32 in position 4 shows the difference between the automatic set point and the measurement, and in position 3 shows the difference between the manual and automatic set points. Note that in position 2, the computer set point station indicator 32 is used. That is to say the indicator 33 of the controller 12 is used only when the controller 12 is on manual operation. When the indicators 32 and 33 are not connected in operation they are arranged to automatically go to zero to facilitate indication of which indication is pertinent to the action at the moment.

In the FIGURE II switching arrangements the unit A is used to complete a circuit in positions 3 and 4 to light a lamp 38 indicating that the automatic system is in operation at those positions.

This invention therefore provides a new and improved industrial control system wherein the set point of an analog controller may be determined from the output of the digital computer in analog pulse form.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

We claim:
1. A system for determining desired set point magnitudes for an analog controller from the output of a digital computer, said system comprising means for establishing analog pulse width magnitude representative of said digital computer output magnitude by translating said computer output to pulse width analog terms, and analog set point means responsive to said analog pulse width to provide analog set point magnitude determinations therefrom representative of the magnitudes of said digital computer output.

2. A system for adjusting the set point magnitudes of an analog controller from the output of a digital computer, said system comprising means for translating magnitudes of said computer output to analog pulse width magnitudes and a set point station responsive to said analog magnitudes to provide representative set point magnitude adjustments representative of said pulse width magnitudes and compatible with analog controller set point adjustment requirements.

3. A computer set point system comprising a digital computer for providing a digital magnitude computation from a plurality of variables, a set point station, a positionable device in said set point station, analog set point means variable in its magnitude according to the position of said positionable device, translation means for deriving a pulse width form of analog magnitude signal from said digital magnitude computation, and means for applying said analog magnitude signal to representatively position said positionable device.

4. A digital computer-analog controller set point system comprising an analog control system, means for applying a set point condition to said analog system, a digital computer for providing a digital computation from a plurality of variables, means for translating said digital computation into a pulse width form of representative analog condition, a computer set point station, a set point positionable device in said set point station, means for positioning said device at an essentially constant rate and according to said representative analog condition, and means for translating the position of said device into a set point condition for application to said analog control system through said set point condition applying means.

5. An industrial control system comprising, in combination, a digital computer, a set point station, an analog controller, means for translating the output of said computer to a pulse width form of analog condition, essentially constant rate means for applying said condition in said set point station, and means for applying, to said analog controller, the reaction of said set point station to said analog condition as a set point variant in said analog controller.

6. A computer set point system comprising a digital computer for providing a digital computation from a plurality of variables, translation means for providing an analog signal in the form of an electrical pulse width representation of said computation, an analog controller positionable set point device, and means for positioning said analog device at an essentially constant rate in response to said pulse width representation.

7. An industrial control system comprising an analog control system, a variable set point device in said analog control system, a digital computer for providing a digital computation from a plurality of variables, and a coupling and translating system including means for translating said digital computation into a pulse width representation thereof, and for applying the output of said digital computer at an essentially constant rate to vary said analog set point device on the basis of said pulse width representation.

8. An industrial control system wherein digital and analog functions are combined to provide set point control in an analog control system in response to digital computation from a plurality of variables, said industrial control system comprising an analog control system whose set point is controllable as to magnitude on an analog basis from a digital computer through digital to pulse width form of analog translation means and a set point station responsive at an essentially fixed rate to the output of said translation means.

9. A computer set point system comprising a digital computer for providing a digital computation from a plurality of variables, translation means for providing a pulse width form of value magnitude analog signal in representation of said computation, a positionable analog controller set point device, means for positioning said analog device at an essentially constant rate in response to said analog pulse width magnitude signal, and means for feeding back to said computer as one of said variables, a representation of the position of said analog controller set point device.

10. An industrial control system comprising, in combination, a digital computer, a set point station, an analog controller, means for translating the output of said computer to a pulse width form of variable magnitude analog condition, means for applying said condition in said set point station at an essentially constant rate, means for applying to said analog controller as a set point variant and to the input of said computer as feed back, the reaction of said set point station to said analog condition.

11. An industrial control system comprising, in combination, a digital computer, a set point station, an analog controller, means for translating the output of said computer to analog condition in the form of pulse width magnitude representation, means for applying said condition in said set point station at an essentially constant rate, and means for applying to said analog controller as a set point variant and to the input of said computer as feedback, the reaction of said set point station to said analog condition.

12. In a digital computer, analog controller, set point system, a set point station comprising a member positionable at an essentially constant rate from a digital computer on a pulse width magnitude analog basis, an indicator for referencing the position of said member against a related condition, and a switching system for selectively establishing said station as a desired set point indicator and as a combination desired set point indicator and adjuster.

13. In a digital computer, analog controller, set point system, the combination of digital to pulse width magnitude analog condition translation means and a set point station operated from said analog condition and comprising a member positionable from a digital computer through said translation means at an essentially constant rate on an analog basis, an indicator for referencing the position of said member against a related condition, and a switching system for selectively establishing said station as a desired set point indicator and as a combination desired set point indicator and adjuster.

14. In a digital computer, analog controller, set point system, the combination of an analog controller and an analog set point station for automatically varying the set point of said controller at an essentially constant rate in accordance with a pulse width magnitude analog representation of the output of a digital computer, means for manually varying said set point, and switching means for selectively establishing said manual and automatic set point adjustment conditions.

15. An industrial control system comprising, in combination, an analog controller and an analog set point station for automatically varying the set point of said controller at an essentially constant rate in accordance with analog pulse width signal magnitude, indicator means for providing, under said automatic situation a difference indication of automatic set point versus the measurement to the controller, means for manually varying said set point, further indicator means for providing, under said manual situation, a difference indication of manual set point versus the measurement to the controller, and switching means for selectively establishing said manual and automatic set point adjustment situations, said switching means including means for temporarily establishing, in one of said indicators, a difference indication of automatic versus manual set point as a step in achieving bumpless transfer between said manual and automatic situations.

16. An industrial control system comprising, in combination, a digital computer, a set point station, an analog controller, means for translating the output of said computer to analog condition at an essentially constant rate in the form of pulse width magnitude representation, means for applying to the input of said computer as feedback and automatically to said analog controller as a set point variation, the reaction of said set point station to said analog pulse width condition, indicator means for providing, under said automatic situation a difference indication of automatic set point versus the measurement to the controller, means for manually varying said set point, further indicator means for providing, under said manual situation, a difference indication of manual set point versus the measurement to the controller, and switching means for selectively establishing said manual and automatic set point adjustment situations, said switching means including means for temporarily establishing, in one of said indicators, a difference indication of automatic versus manual set point as a step in achieving bumpless transfer between said manual and automatic situations.

References Cited in the file of this patent
UNITED STATES PATENTS 2,775,727   Kernahan et al. _____ Dec. 25, 1956

OTHER REFERENCES

"Process Automation," Chemical Engineering, June 1957, pp. 121–136.

"Tape Controlled Transfer Machine," Automation, June 1958, pp. 34–40.